(12) United States Patent
Billiard et al.

(10) Patent No.: US 10,875,134 B2
(45) Date of Patent: Dec. 29, 2020

(54) WASHER DISPENSING SYSTEMS AND METHODS

(71) Applicant: THE BOEING COMPANY, Chicago, IL (US)

(72) Inventors: Phillip A. Billiard, Collegeville, PA (US); Bercely Hurtado Otalora, Philadelphia, PA (US)

(73) Assignee: THE BOEING COMPANY, Chicago, IL (US)

( * ) Notice: Subject to any disclaimer, the term of this patent is extended or adjusted under 35 U.S.C. 154(b) by 231 days.

(21) Appl. No.: 15/997,773

(22) Filed: Jun. 5, 2018

(65) Prior Publication Data
US 2019/0366493 A1  Dec. 5, 2019

(51) Int. Cl.
  *B23P 19/00* (2006.01)
  *B23P 19/08* (2006.01)
(52) U.S. Cl.
  CPC .......... *B23P 19/082* (2013.01); *B23P 19/002* (2013.01); *B23P 19/004* (2013.01); *B23P 19/006* (2013.01)

(58) Field of Classification Search
  None
  See application file for complete search history.

(56) References Cited

U.S. PATENT DOCUMENTS 3,132,766 A * 5/1964 Kerger ..................... B21J 15/32
                                                    221/175
4,174,028 A * 11/1979 Barnes ............... B65G 47/1492
                                                    198/389

* cited by examiner

*Primary Examiner* — Gene O Crawford
*Assistant Examiner* — Ayodeji T Ojofeitimi
(74) *Attorney, Agent, or Firm* — The Small Patent Law Group LLC; Joseph M. Butscher (57) ABSTRACT

A washer dispensing system includes a retaining bin that is configured to receive washers within a washer-retaining chamber. The retaining bin includes a bin outlet connected to the washer-retaining chamber. A vibration motor is coupled to the retaining bin. The vibration motor is configured to vibrate at least a portion of the retaining bin to move the washers towards the bin outlet. A discharge chute is coupled to the retaining bin. The discharge chute includes a washer delivery channel connected to the bin outlet.

24 Claims, 5 Drawing Sheets

WASHER DISPENSING SYSTEMS AND METHODS

FIELD OF EMBODIMENTS OF THE DISCLOSURE

Embodiments of the present disclosure generally relate to washer dispensing systems and methods, such as may be used to deliver washers to a position where they can be efficiently coupled to counterparts (for example, bolts or screws) to form fastener assemblies.

BACKGROUND OF THE DISCLOSURE

Fasteners such as bolts and washers are often provided together to an end user. For example, a fastener may include a washer positioned around a shaft of a bolt. During a manufacturing process, the bolts and washers are coupled together by individuals during a kitting process.

Kitting nuts, bolts, and washers is labor intensive, costly, and prone to errors. For example, washers are typically small and difficult to handle. The process of positioning a washer on a bolt is repeated hundreds or thousands of times, which may lead to repetitive motion injuries for individuals tasked with kitting fasteners.

In general, a fastener kitting process is a completely manual effort. Bolts and washers are placed in different buckets, and a single bolt and single washer are removed and the washer installed on the bolt, thereby requiring use of two hands, and repetitive motions. In addition, care must be taken to install the correct washer on the correct bolt. A fastener kit having a large number of fasteners may have five or six different bolts and six or more different washer sizes and thicknesses. It is up to the individual building the fastener kit to select the correct washer (diameter and thickness) for each bolt. As such, the individual needs to carefully locate a bolt that corresponds to a correct washer, and manipulate the fastener with one hand, and the washer with the other hand. As can be appreciated, such kitting process may prove tedious, time consuming, and prone to error.

SUMMARY OF THE DISCLOSURE

A need exists for a system and method of automatically dispensing washers to a position where they may be quickly, easily, and efficiently coupled to counterparts, such as bolts.

With that need in mind, certain embodiments of the present disclosure provide a washer dispensing system that includes a retaining bin that is configured to receive washers within a washer-retaining chamber (for example, hold a quantity of washers). The retaining bin includes a bin outlet connected to the washer-retaining chamber. A vibration motor is coupled to the retaining bin. The vibration motor is configured to vibrate at least a portion of the retaining bin to move the washers towards the bin outlet. A discharge chute is coupled to the retaining bin. The discharge chute includes a washer delivery channel connected to the bin outlet.

The retaining bin may include lead-in walls that inwardly angle towards the bin outlet. The lead-in walls are configured to direct the washers towards the bin outlet.

In at least one embodiment, the bin outlet is sized and shaped to receive only one of the washers at one time. For example, the bin outlet may have a width and a height that are slightly larger than a diameter and a thickness of a plurality of the washers.

The discharge chute may include a bed and opposed side rails. The washer delivery channel is defined between the bed and the side rails.

The discharge chute may include a recessed opening proximate to a delivery end. The discharge chute is configured to stop at least one of the washers at the delivery end over the recessed opening such that a central hole of the at least one washer is positioned over the recessed opening.

The discharge chute may include one or more slots formed in one or more side rails proximate to a delivery end. The slots are configured to retain portions of resilient stops that are configured to extend into a washer delivery channel to stop one or more of the washers.

In at least one embodiment, a base of the retaining bin is downwardly angled towards the bin outlet to allow gravity to draw the washers towards the bin outlet. The washer dispensing system may include a mounting flange that downwardly angles a base of the retaining bin towards the bin outlet to allow gravity to draw the washer towards the bin outlet.

One or more resilient stops may be proximate to a delivery end of the discharge chute. In at least one embodiment, the resilient stop(s) may include an anchor retained within a portion of the discharge chute, and a spring extending into the washer delivery channel.

Certain embodiments of the present disclosure provide a washer dispensing method that includes coupling a vibration motor to a retaining bin including a washer-retaining chamber connected to a bin outlet, coupling the retaining bin to a discharge chute including a washer delivery channel connected to the bin outlet, receiving washers within the washer-retaining chamber of the retaining bin, operating the vibration motor to vibrate at least a portion of the retaining bin to move at least one of the washers towards and into the bin outlet, and moving at least one of the washers into the washer delivery channel from the bin outlet.

The method may also include directing the washers towards the bin outlet with lead-in walls that inwardly angle towards the bin outlet, stopping at least one of the washers over a recessed opening proximate to a delivery end of the discharge chute, angling a base of the retaining bin towards the bin outlet to allow gravity to draw the washers towards the bin outlet, and/or securing one or more resilient stops proximate to a delivery end of the discharge chute.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide washer dispensing systems and methods that significantly reduce costs and improve accuracy and quality of kitting operations. The systems and methods are configured to dispense washers one at a time, thereby allowing counterparts, such as bolts, to be coupled to the dispensed washers via a one hand operation. It has been found that a kitting process that dispenses washers one at a time to a position where counterparts can be quickly and easily coupled to the washers reduces costs, installation time, and incorrect coupling of parts.

Embodiments of the present disclosure provide systems and methods that use a combination of gravity, vibration, and a chute to automatically dispense a correct washer. The chute stops each washer at an end thereof. At that point, a bolt can be inserted through the hole in the washer via one-handed manipulation, thereby providing a fastener assembly. The correct diameter and thickness of the washer is controlled by the opening at the inlet of the chute. Accuracy and quality are controlled by the size of the opening in the chute. The opening may only allow one washer to pass at a time. Larger and/or thicker washers are unable to pass into the opening, and smaller diameter washers will not fit on the bolt. Different chutes may be made for different washers, and easily changed out on the washer bin area.

Certain embodiments of the present disclosure provide a washer dispensing system that includes a bin having a vibrating base for moving washers towards an aperture through which correct-sized washers pass. A discharge chute receives washers passing through the aperture. The discharge chute includes side rails that align and guide washers to a recessed opening in an end portion of the chute. At least one resilient stop (such as a spring member) may be disposed in an end portion of one side rail, and extends into the chute to cause a washer in the chute to stop at a fixed position relative to the slot in the chute. The resilient stop(s) is configured to engage a washer at the end portion of the chute and stop forward motion of the washer at a position in which the center of the washer is approximately aligned with a center of the recessed opening. The resilient stop(s) may be configured to resiliently deflect to permit the washer to be pulled past the stop(s), after which the stop(s) returns to engage and stop forward motion of the next washer in the chute at the correct position relative to the recessed opening.

In at least one embodiment, the resilient stop(s) is disposed in a transverse slot in a side rail of the chute. At least two resilient stop(s) may be disposed in transverse slots in opposing side rails of the chute.

Figure 1:
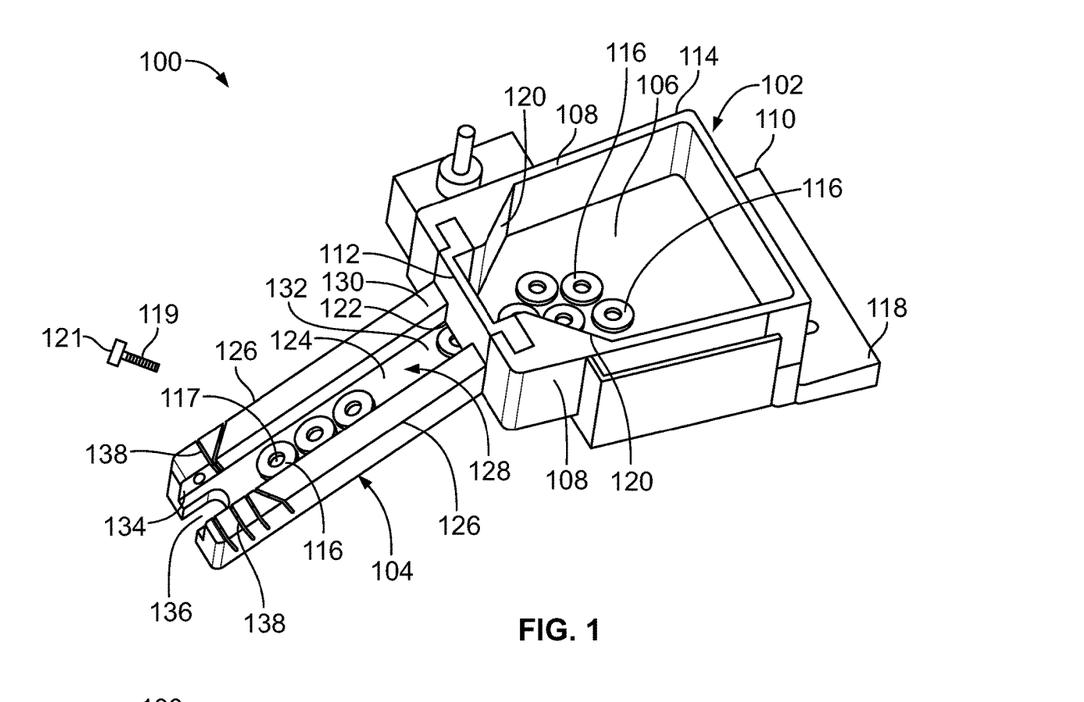
FIG. 1 illustrates a perspective top view of a washer dispensing system, according to an embodiment of the present disclosure.

FIG. 1 illustrates a perspective top view of a washer dispensing system 100, according to an embodiment of the present disclosure. The washer dispensing system 100 includes a retaining bin 102 and a discharge chute 104.

The retaining bin 102 includes a base 106 connected to upstanding sidewalls 108, a rear wall 110, and a front wall 112. A washer-retaining chamber 114 is defined between the base 106, the sidewalls 108, the rear wall 110, and the front wall 112. Washers 116 may be placed into the washer-retaining chamber 114. That is, the washer-retaining chamber 114 is configured to receive the washers 116.

A mounting flange 118 may extend rearwardly from a lower portion of the rear wall 110. The mounting flange 118 is configured to securely couple the washer dispensing system 100 to a structure, such as a wall. In a least one other embodiment, the washer dispensing system 100 may be supported by an extended base portion, such as a column, legs, or the like. That is, instead of being mounted to a wall, for example, the washer dispensing system 100 may be supported on a floor, for example.

The retaining bin 102 also includes inwardly-angled lead-in walls 120 that inwardly angle toward an aperture, such as a bin outlet 122, formed at a central lower portion of the front wall 112. The lead-in walls 120 are configured to direct the washers 116 towards and into the bin outlet 122.

The bin outlet 122 is sized and shaped to allow for only one washer 116 to pass into and through at a time. For example, the bin outlet 122 may have a width and height that is slightly larger (such as 1-5% larger) than a diameter and thickness of the washer 116. As such, the bin outlet 122 prevents multiple washers 116 from entering at any one time. Moreover, the bin outlet 122 ensures that only proper sized washers 116 enter and pass therethrough. For example, a larger washer (not shown) having a diameter and/or thickness that exceeds that width and height of the bin outlet 122 is incapable of passing into the bin outlet 122. Conversely, while a smaller washer may pass into the bin outlet 122, when a bolt that is sized and shaped to be coupled to a washer 116 is attempted to be mated with the smaller washer, the shaft of the bolt will be too large to fit into a central hole of the washer.

The discharge chute 104 includes a bed 124 and opposed side rails 126. A washer delivery channel 128 is defined between the bed 124 and the side rails 126. A receiving end 130 of the discharge chute 104 connects to the front wall 112 of the retaining bin 102 such that the bin outlet 122 connects to an inlet 132 of the washer delivery channel 128. A delivery end 134 is opposite from the receiving end 130. A recessed opening 136 extends into the bed 124 at the delivery end 134.

One or more slots 138 may be formed in the side rails 126 proximate to the delivery end 134. The slots 138 are configured to retain portions of resilient stops that are configured to extend into the washer delivery channel 128 to stop washers over the recessed opening 136. For example, the stops are configured to stop each delivered washer 116 over the opening 136 such that central hole 117 is positioned over the opening 136, thereby allowing a shaft 119 of a bolt 121 to be inserted into and through the central hole 117.

Figure 2:
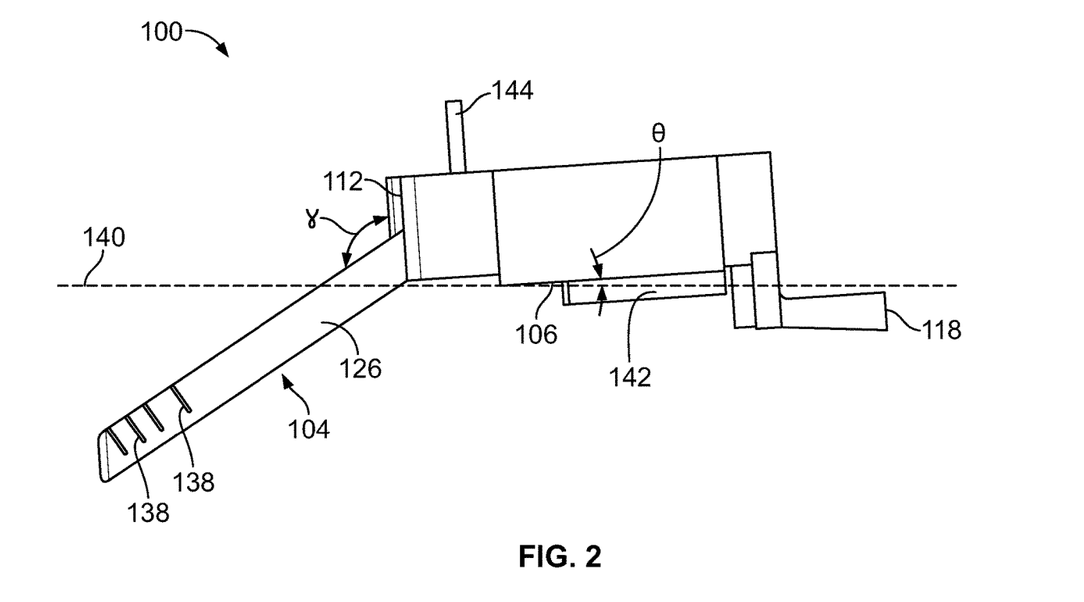
FIG. 2 illustrates a lateral view of the washer dispensing system.

FIG. 2 illustrates a lateral view of the washer dispensing system 100. As shown, the base 106 of the retaining bin 102 angles downwardly towards the front wall at an angle θ with respect to a horizontal plane 140. In at least one embodiment, the mounting flange 118 downwardly angles the washer dispensing system 100. For example, the mounting flange 118 mounts the washer dispensing system 100 to a structure (such as a table) and disposes the base 106 at the angle θ. The angle θ may be between 5-15 degrees. Optionally, the angle θ may be less than 5 degrees, or greater than 15 degrees. The rate of delivery of the washers 116 into the bin outlet 122 increases with increasing θ.

Referring to FIGS. 1 and 2, the angle θ of the base 106 in relation to the horizontal plane 140 allows gravity to draw the washers 116 towards the bin outlet 122. As the washers 116 are pulled towards the bin outlet 122 via gravity, the lead-in walls 120 draw and lead the washers 116 towards and into the bin outlet 122.

Additionally, a vibration motor 142 may be coupled to the base 106. The vibration motor 142 may be an electric, pneumatic, or other such motor that is configured to impart vibratory energy into the base 106. The vibratory energy imparted into the base 106 by the vibration motor 142 causes the washers 116 to lie flat onto the base 106 and move towards the bin outlet 122 at an increased rate. The vibration motor 142 may be operated via a control member 144, such as a switch, dial, and/or the like. With increased vibratory energy imparted by the vibration motor 142, the washers 116 move at a faster rate towards the bin outlet 122. Conversely, decreasing the vibratory energy slows the rate of the washers 116 towards the bin outlet 122. An operator is able to control the vibration motor 142 to ensure a desired delivery rate of the washers 116 into the bin outlet 122. Alternatively, the washer dispensing system 100 may not include the vibration motor 142. Instead, delivery of the washers 116 into the bin outlet 122 may be dictated solely by gravity.

As shown, the discharge chute 104 connects to the front wall 112 of the retaining bin at an angle γ, which may be between 110-135 degrees. Optionally, the angle γ may be less than 110 degrees or greater than 135 degrees. The rate of descent of the washers 116 within the washer delivery channel 128 is dictated, at least in part, by angle γ. For example, if a faster rate of descent is desired, the angle γ is increased, but if a slower rate of descent is desired, the angle γ is decreased.

Figure 3:
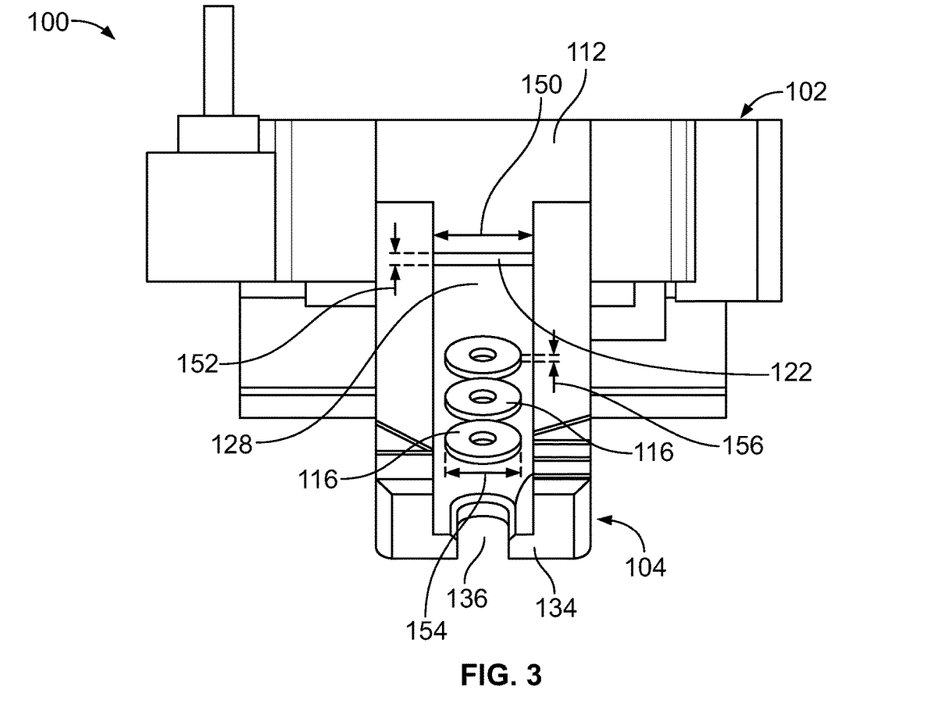
FIG. 3 illustrates a front view of the washer dispensing system.

FIG. 3 illustrates a front view of the washer dispensing system 100. As shown, the bin outlet 122 has a width 150 and a height 152. The width 150 is slightly larger than a diameter 154 and height 156 of the washers 116. As such, only one washer 116 is able to pass through the bin outlet 122 at any one time.

If a washer 116 is stopped at the delivery end 134 of the discharge chute 104, and other washers 116 are delivered into the washer delivery channel 128, the other washers 116 are stopped as they abut into the washer 116 at the delivery end 134 and each other. As such, a full line of washers 116 within the discharge chute 104 blocks washers 116 within the retaining bin 102 from passing out of the bin outlet 122. In this manner, the washer dispensing system 100 prevents washers 116 from spilling out of the discharge chute 104.

Figure 4:
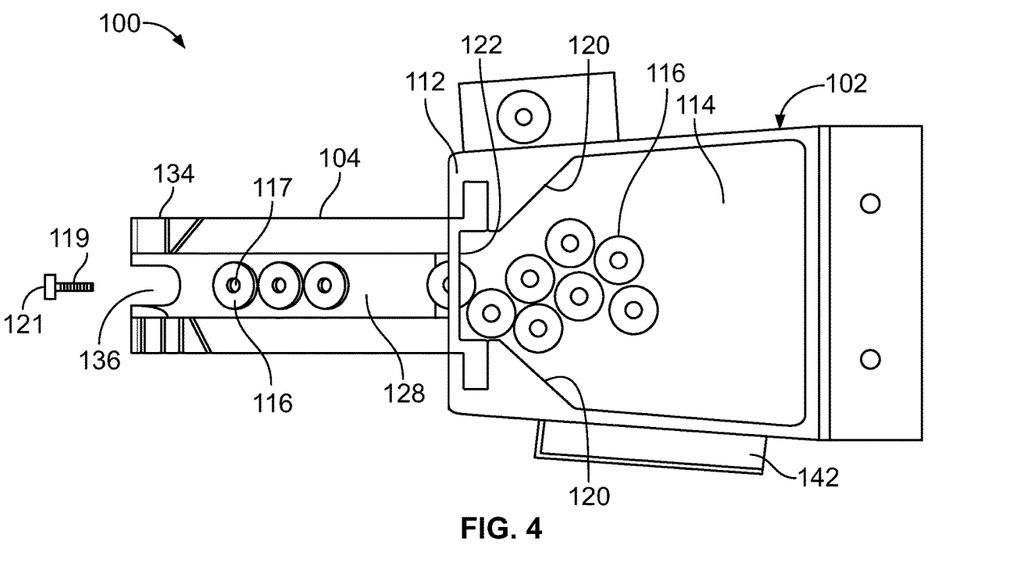
FIG. 4 illustrates a top view of the washer dispensing system.

FIG. 4 illustrates a top view of the washer dispensing system 100. Referring to FIGS. 1-4, in operation, the washers 116 within the washer-retaining chamber 114 move towards the bin outlet 122, such as via gravity and/or vibratory energy imparted into the base 106 via the vibration motor 142. The lead-in walls 120 automatically direct the washers 116 towards and into the bin outlet 122 as the washers 116 move towards the front wall 112.

The bin outlet 122 prevents multiple washers 116 (or oversized washers) from passing therein. As such, only proper sized washers 116 pass into and through the bin outlet 122 and into the washer delivery channel 128. Each washer 116 then slides down the washer delivery channel 128 until stopped at the delivery end 134 over the recessed opening 136. In this position, the central hole 117 is aligned over the recessed opening 136, and a shaft 119 of a bolt 121 may be inserted into and through the central hole 117 (and into the recessed opening 136) to couple the bolt 121 to the washer 116. The completed fastener assembly (including the washer 116 coupled to the bolt 121) may then be removed from the delivery end 134, thereby allowing the next washer 116 to move over the recessed opening 136.

Figures 5, 6:
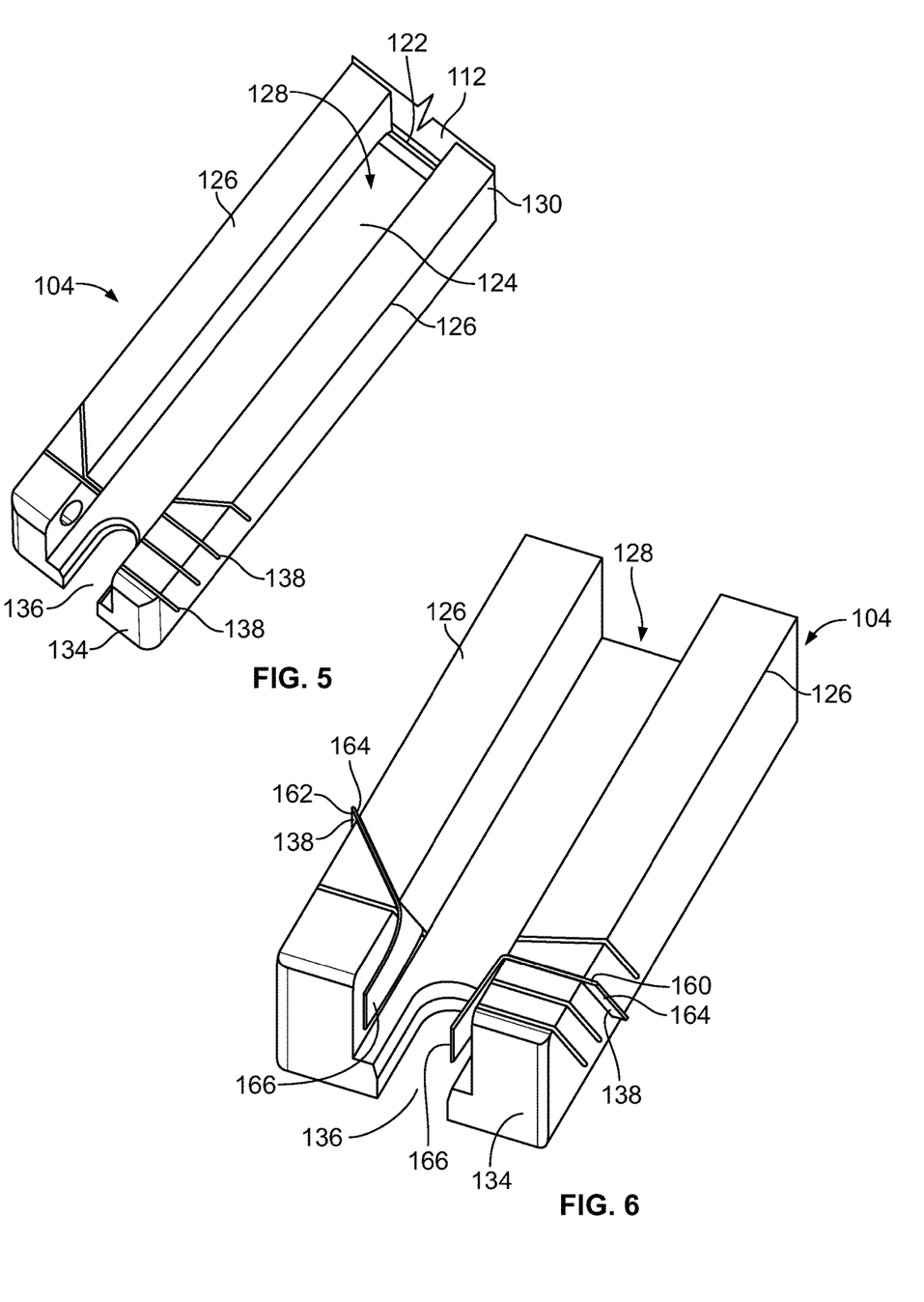
FIG. 5 illustrates a perspective top view of a discharge chute, according to an embodiment of the present disclosure.
FIG. 6 illustrates a perspective front view of a discharge chute, according to an embodiment of the present disclosure.

FIG. 5 illustrates a perspective top view of the discharge chute 104. As shown, the discharge chute 104 includes a plurality of slots 138 extending into the side rails 126 proximate to the delivery end 134. The slots 138 are configured to retain portions of resilient stops. The delivery end 134 may include more or less slots 138 than shown.

FIG. 6 illustrates a perspective front view of the discharge chute 104, according to an embodiment of the present disclosure. Resilient stops 160 and 162 are secured to the side rails 126 proximate to the delivery end 134. The resilient stops 160 and 162 may be formed of a resilient and deflectable material. For example, the resilient stops 160 and 162 may be leaf springs formed of metal shim stock.

Each resilient stop 160 and 162 includes an anchor 164 retained within a slot 138, and a spring 166 extending into the washer delivery channel 128 proximate to the recessed opening 136. The springs 166 are deflectable and configured to cooperate to stop washers 116 (shown in FIGS. 1, 3, and 4) over the recessed opening 136. The springs 166 may be angled as desired to stop washers 116 of a particular diameter. For example, the springs 166 may be angled to engage proper sized washers 116, but allow undersized washers to pass therebetween and out of the delivery end 134. The various angles of the different slots 138 allow for resilient stops 160 and 162 of different angles and deflectability.

In at least one other embodiment, only one of the stops 160 or 162 may be used. Alternatively, various other stopping structures may be used. For example, the delivery end 134 may include a lower catch at a distal edge that stops the washers 116 over the recessed opening 136. In at least one other embodiment, interior surfaces of the side rails 126 may taper down towards the delivery end 134 to stop the washers 116 over the recessed opening 136. As another example, a mesh screen, net, or the like may be mounted at the delivery end 134.

Referring to FIGS. 1-6, the side rails 126 align and guide the washers 116 to the recessed opening 136 at the delivery end 134 of the discharge chute 104. At least one resilient stop 160 and/or 162 may be disposed at the delivery end 134, and extends into the washer delivery channel 128 to cause the washer 116 to stop at a fixed position relative to the recessed opening 136. The resilient stops 160 and 162 are configured to engage a washer 116 at the delivery end 134 of the discharge chute 104 and stop forward motion of the washer 116 at a position in which the center of the washer 116 is approximately aligned with a recessed opening 136. The resilient stops 160 and 162 may be configured to resiliently deflect to permit the washer 116 to be pulled past the stops 160 and 162, after which the stops 160 and 162 return to engage and stop forward motion of the next washer 116 in the washer delivery channel 128 at the correct position relative to the recessed opening 136. In at least one embodiment, the anchors 164 of the resilient stops 160 and 162 are secured within the transverse slot 138 in the side rail 126 of the discharge chute 104.

As described herein, the washer dispensing system 100 includes the retaining bin 102 that is configured to receive the washers 116 within the washer-retaining chamber 114. The retaining bin 102 includes the bin outlet 122 connected to the washer-retaining chamber 114. As such, the washers 116 may pass from the washer-retaining chamber 114 into the bin outlet 122. The vibration motor 142 is coupled to the retaining bin 102. The vibration motor 142 is configured to vibrate at least a portion of the retaining bin 102 (such as the base 106) to move the washers 116 towards the bin outlet 122. The discharge chute 104 is coupled to the retaining bin 102. The discharge chute 104 includes the washer delivery channel 128 connected to the bin outlet 122. Therefore, washers 116 that pass into and out of the bin outlet 122 pass into the washer delivery channel 128.

The bin outlet 122 is sized and shaped to receive only one of the washers 116 at one time. For example, the bin outlet 122 has a width and a height that are slightly larger than a diameter and a thickness of a plurality of washers 116 that are configured to pass through the bin outlet 122.

Figure 7:
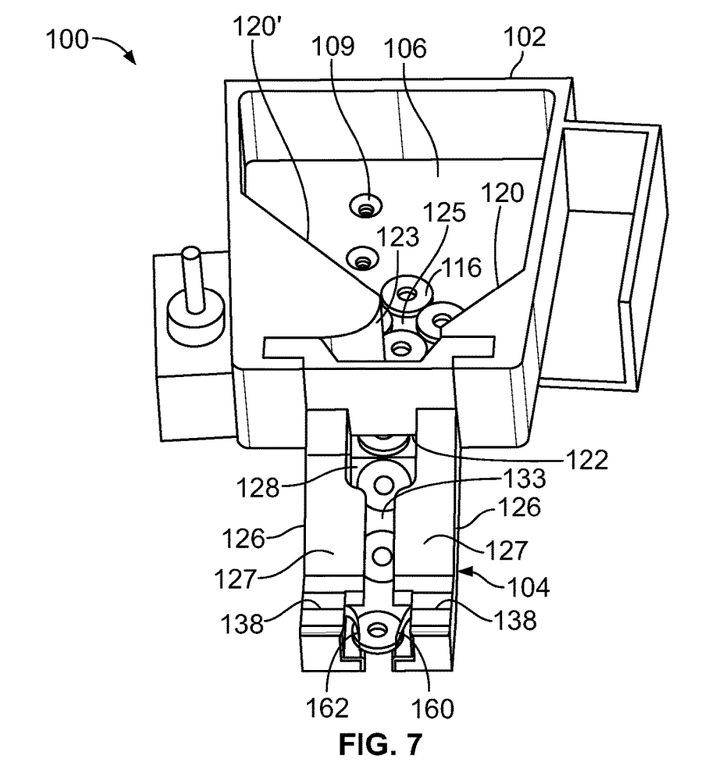
FIG. 7 illustrates a perspective front view of a washer dispensing system, according to an embodiment of the present disclosure.

FIG. 7 illustrates a perspective front view of a washer dispensing system 100, according to an embodiment of the present disclosure. In this embodiment, one of the lead-in walls 120' may be longer than the opposed lead-in wall 120. The lead-in wall 120' may include an inwardly-curved portion 123 proximate to the bin outlet 122. A clearance gap 125 is defined between the inwardly-curved portion 123 and the lead-in wall 120. The clearance gap 125 may be sized to allow only a single flat washer 116 through at a time, thereby ensuring that washers 116 do not jam in an area directly in front of the bin outlet 122.

The base 106 of the retaining bin 102 may include one or more fastener through-holes 109. The fastener through-holes 109 may be configured to receive fasteners that secure the vibration motor 142 (shown in FIG. 2) to an underside of the base 106.

Covering panels 127 may extend from the side rails 126 over at least a portion of the washer delivery channel 128. The covering panels 127 are configured to cover portions of the washers 116 to prevent washers 116 from stacking up as they descend down the discharge chute 104. The covering panels 127 may oppose one another, and provide a space 133 therebetween. The space 133 provides access to the washer delivery channel 128, such that an individual may clear material therefrom.

Each of the slots 138 may be perpendicular to a direction of travel of the washers 116 down the washer delivery channel 128. Optionally, the slots 138 may be angled differently than shown.

Figure 8:
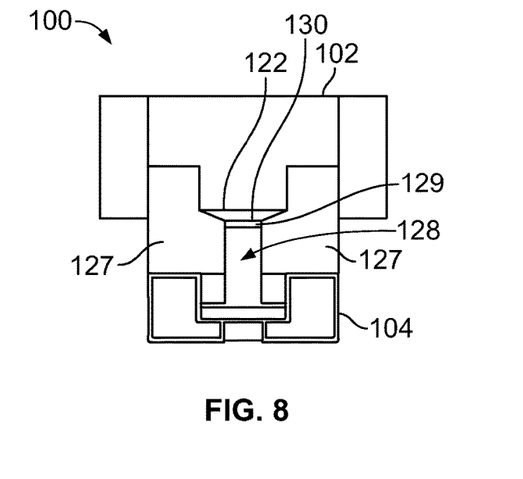
FIG. 8 illustrates a front view of a washer dispensing system, according to an embodiment of the present disclosure.

FIG. 8 illustrates a front view of the washer dispensing system 100 of FIG. 7. The receiving end 130 of the washer delivery channel 128 that directly connects to the bin outlet 122 may include a downwardly-curved, radiused surface 129 that prevents the washers 116 from binding when transferring from out of the bin outlet 122 into the washer delivery channel 128.

Figure 9:
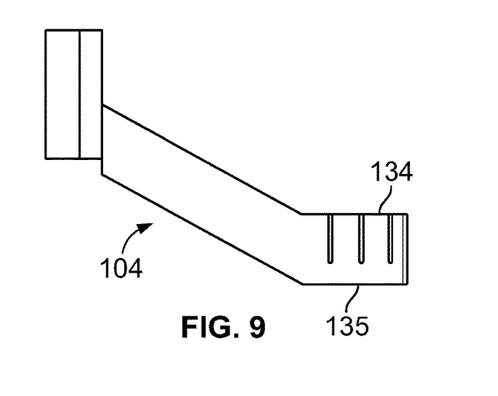
FIG. 9 illustrates a lateral view of a discharge chute, according to an embodiment of the present disclosure.

FIG. 9 illustrates a lateral view of a discharge chute 104, according to an embodiment of the present disclosure. The angle of the discharge chute 104 may be greater or less than shown. A bottom surface 135 of the delivery end 134 may be flat. The flat bottom surface 135 provides a stable base for the discharge chute 104 that prevents, minimizes, or otherwise reduces the potential of a washer being shaken out of the delivery end 134 when retained by the stops 160 and 162 (shown in FIGS. 6 and 7, for example).

Figure 10:
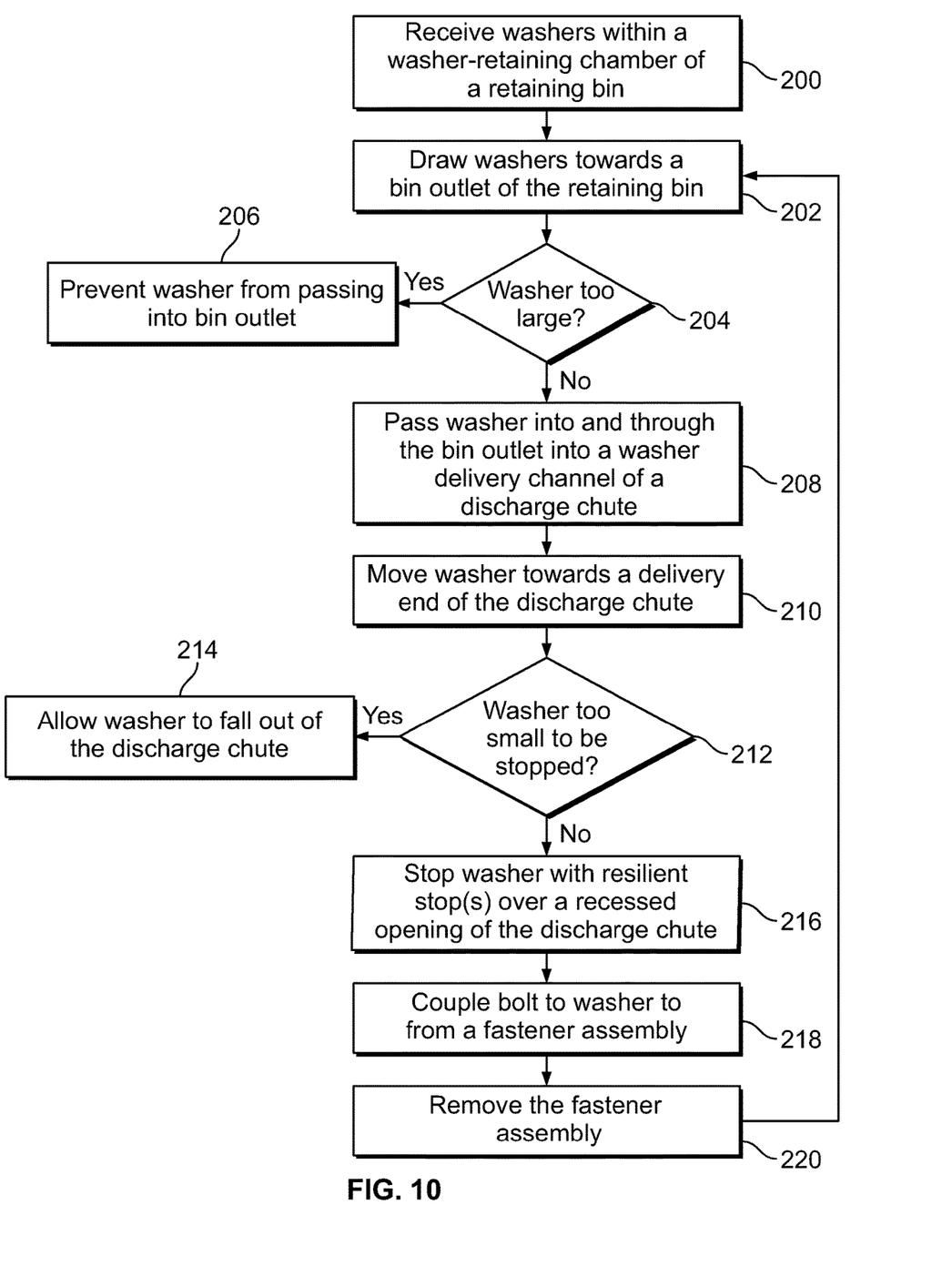
FIG. 10 illustrates a flow chart of a washer dispensing method, according to an embodiment of the present disclosure.

FIG. 10 illustrates a flow chart of a washer dispensing method, according to an embodiment of the present disclosure. Referring to FIGS. 1-7, at 200, washers 116 are received within the washer-retaining chamber 114 of the retaining bin 102. At 202, the washers 116 are drawn towards the bin outlet 122 of the retaining bin 102, such as via gravity and/or vibratory energy imparted into the base 106 by the vibration motor 142.

If the washer is too large to fit into the bin outlet 122 at 204, the washer is prevented from passing into the bin outlet 122 at 206. If, however, the washer is not too large to fit into the bin outlet 122 at 204, at 208 the washer passes into and through the bin outlet 122 into the washer delivery channel 128 of the discharge chute 104.

At 210, the washer is moved towards the delivery end 134 of the discharge chute 104, such as through gravity. At 212, if the washer is too small to be stopped by one or more stops 160 and/or 162 at the delivery end 134, the washer falls out of the delivery end 134 of the discharge chute 104 at 214. If, however, the washer is not too small to be stopped at 212, the washer 116 is stopped by the resilient stop(s) 160 and/or 162 over the recessed opening 136 of the discharge chute 104 at 216.

At 218, a bolt 121 is coupled to the washer 116 to form a fastener assembly. At 220, the fastener assembly is removed from the delivery end 134 of the discharge chute 104, and the process returns to 202.

As described herein, embodiments of the present disclosure provide systems and methods of automatically dispensing washers to a position where they may be quickly, easily, and efficiently coupled to counterparts, such as bolts, to form fastener assemblies.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A washer dispensing system, comprising:
    a retaining bin that is configured to receive washers within a washer-retaining chamber, the retaining bin comprising a bin outlet connected to the washer-retaining chamber;
    a vibration motor coupled to the retaining bin, the vibration motor being configured to vibrate at least a portion of the retaining bin to move the washers towards the bin outlet; and
    a discharge chute coupled to the retaining bin, the discharge chute comprising:
        a washer delivery channel connected to the bin outlet; and
        a recessed opening proximate to a delivery end, wherein the discharge chute is configured to stop at least one of the washers at the delivery end over the recessed opening such that a central hole of the at least one washer is positioned over the recessed opening.

2. The washer dispensing system of claim 1, wherein the retaining bin further comprises lead-in walls that inwardly angle towards the bin outlet, wherein the lead-in walls are configured to direct the washers towards the bin outlet.

3. The washer dispensing system of claim 1, wherein the bin outlet is sized and shaped to receive only one of the washers at one time.

4. The washer dispensing system of claim 1, wherein the bin outlet has a width and a height that are slightly larger than a diameter and a thickness of a plurality of the washers.

5. The washer dispensing system of claim 1, wherein the discharge chute further comprises a bed and opposed side rails, wherein the washer delivery channel is defined between the bed and the side rails.

6. The washer dispensing system of claim 1, wherein the discharge chute further comprises one or more slots formed in one or more side rails proximate to a delivery end, wherein the one or more slots are configured to retain portions of resilient stops that are configured to extend into a washer delivery channel to stop one or more of the washers.

7. The washer dispensing system of claim 1, wherein a base of the retaining bin is downwardly angled towards the bin outlet to allow gravity to draw the washers towards the bin outlet.

8. The washer dispensing system of claim 1, further comprising a mounting flange that downwardly angles a base of the retaining bin towards the bin outlet to allow gravity to draw the washer towards the bin outlet.

9. The washer dispensing system of claim 1, further comprising one or more resilient stops proximate to a delivery end of the discharge chute.

10. The washer dispensing system of claim 9, wherein the one or more resilient stops comprise an anchor retained within a portion of the discharge chute, and a spring extending into the washer delivery channel.

11. A washer dispensing method, comprising:
    coupling a vibration motor to a retaining bin including a washer-retaining chamber connected to a bin outlet;
    coupling the retaining bin to a discharge chute including a washer delivery channel connected to the bin outlet;
    receiving washers within the washer-retaining chamber of the retaining bin;
    operating the vibration motor to vibrate at least a portion of the retaining bin to move at least one of the washers towards and into the bin outlet;
    moving the at least one of the washers into the washer delivery channel from the bin outlet; and
    stopping at least one of the washers over a recessed opening proximate to a delivery end of the discharge chute.

12. The washer dispensing method of claim 11, further comprising directing the washers towards the bin outlet with lead-in walls that inwardly angle towards the bin outlet.

13. The washer dispensing method of claim 11, wherein the bin outlet is sized and shaped to receive only one of the washers at one time.

14. The washer dispensing method of claim 11, further comprising retaining portions of resilient stops in one or more slots formed in one or more side rails proximate to a delivery end of the discharge chute.

15. The washer dispensing method of claim 11, further comprising downwardly angling a base of the retaining bin towards the bin outlet to allow gravity to draw the washers towards the bin outlet.

16. The washer dispensing method of claim 11, further comprising securing one or more resilient stops proximate to a delivery end of the discharge chute.

17. The washer dispensing method of claim 11, further comprising retaining an anchor of a resilient stop within a portion of the discharge chute, and extending a spring of the resilient stop into the washer delivery channel.

18. A washer dispensing system, comprising:
    a retaining bin that is configured to receive washers within a washer-retaining chamber, the retaining bin comprising a bin outlet connected to the washer-retaining chamber, and lead-in walls that inwardly angle towards the bin outlet, wherein the bin outlet is sized and shaped to receive only one of the washers at one time, wherein the lead-in walls are configured to direct the washers towards the bin outlet, wherein a base of the retaining bin is downwardly angled towards the bin outlet to allow gravity to draw the washers towards the bin outlet;
    a vibration motor coupled to the retaining bin, the vibration motor being configured to vibrate at least a portion of the retaining bin to move the washers towards the bin outlet;
    a discharge chute coupled to the retaining bin, the discharge chute including a bed and opposed side rails that define a washer delivery channel that is connected to the bin outlet, and a recessed opening proximate to a delivery end, wherein the discharge chute is configured to stop at least one of the washers at the delivery end over the recessed opening; and one or more resilient stops that extend into the washer delivery channel proximate to the recessed opening, wherein the one or more resilient stop are configured to stop one or more of the washers.

19. A washer dispensing system, comprising:

a retaining bin that is configured to receive washers within a washer-retaining chamber, the retaining bin comprising a bin outlet connected to the washer-retaining chamber;

a mounting flange that downwardly angles a base of the retaining bin towards the bin outlet to allow gravity to draw the washer towards the bin outlet;

a vibration motor coupled to the retaining bin, the vibration motor being configured to vibrate at least a portion of the retaining bin to move the washers towards the bin outlet; and a discharge chute coupled to the retaining bin, the discharge chute including a washer delivery channel connected to the bin outlet.

20. A washer dispensing system, comprising:

a retaining bin that is configured to receive washers within a washer-retaining chamber, the retaining bin comprising a bin outlet connected to the washer-retaining chamber;

a vibration motor coupled to the retaining bin, the vibration motor being configured to vibrate at least a portion of the retaining bin to move the washers towards the bin outlet;

a discharge chute coupled to the retaining bin, the discharge chute including a washer delivery channel connected to the bin outlet; and one or more resilient stops proximate to a delivery end of the discharge chute.

21. The washer dispensing system of claim 20, wherein the one or more resilient stops comprise an anchor retained within a portion of the discharge chute, and a spring extending into the washer delivery channel.

22. A washer dispensing method, comprising:

coupling a vibration motor to a retaining bin including a washer-retaining chamber connected to a bin outlet;

coupling the retaining bin to a discharge chute including a washer delivery channel connected to the bin outlet;

securing one or more resilient stops proximate to a delivery end of the discharge chute;

receiving washers within the washer-retaining chamber of the retaining bin;

operating the vibration motor to vibrate at least a portion of the retaining bin to move at least one of the washers towards and into the bin outlet; and moving the at least one of the washers into the washer delivery channel from the bin outlet.

23. The washer dispensing method of claim 22, wherein said securing one or more resilient stops comprises retaining portions of the one or more resilient stops in one or more slots formed in one or more side rails proximate to the delivery end of the discharge chute.

24. The washer dispensing method of claim 22, wherein said securing one or more resilient stops comprises retaining an anchor of the one or more resilient stops within a portion of the discharge chute, and extending a spring of the one or more resilient stops into the washer delivery channel.

\* \* \* \* \*